United States Patent
St. Pierre

(10) Patent No.: US 7,237,011 B1
(45) Date of Patent: *Jun. 26, 2007

(54) SYSTEM AND METHOD FOR A PRIORITY MESSAGING PROTOCOL FOR A SHARED DISPLAY DEVICE

(75) Inventor: Robert P. St. Pierre, Sunnyvale, CA (US)

(73) Assignee: Sun Microsystems, Inc., Menlo Park, CA (US)

( * ) Notice: Subject to any disclaimer, the term of this patent is extended or adjusted under 35 U.S.C. 154(b) by 971 days.

This patent is subject to a terminal disclaimer.

(21) Appl. No.: 09/704,179

(22) Filed: Nov. 1, 2000

(51) Int. Cl.
*G06F 15/16* (2006.01)
(52) U.S. Cl. .................... 709/207; 709/203; 709/223
(58) Field of Classification Search ............. 709/203, 709/207–208, 224, 228, 229, 204, 213–214, 709/205, 206; 707/1, 100, 200; 715/526, 715/733, 759; 455/419; 370/235, 353, 411–415, 370/441, 445; 701/1; 719/313–314; 718/102–103
See application file for complete search history.

(56) References Cited

U.S. PATENT DOCUMENTS

| | | | |
|---|---|---|---|
| 5,231,633 A * | 7/1993 | Hluchyj et al. ............. 370/429 |
| 5,392,400 A * | 2/1995 | Berkowitz et al. ........... 709/203 |
| 6,073,177 A * | 6/2000 | Hebel et al. ................. 709/228 |
| 6,108,307 A * | 8/2000 | McConnell et al. ......... 370/235 |
| 6,108,534 A * | 8/2000 | Bourgeois et al. ........... 455/419 |
| 6,157,962 A * | 12/2000 | Hodges et al. ................. 710/1 |
| 6,289,332 B2 * | 9/2001 | Menig et al. ................... 707/1 |
| 6,321,265 B1 * | 11/2001 | Najork et al. ................ 709/224 |
| 6,321,267 B1 * | 11/2001 | Donaldson .................. 709/229 |
| 6,360,152 B1 * | 3/2002 | Ishibashi et al. .............. 701/48 |
| 6,421,694 B1 * | 7/2002 | Nawaz et al. ................ 715/526 |
| 6,442,596 B1 * | 8/2002 | Dyer et al. .................. 709/207 |
| 6,462,755 B1 * | 10/2002 | Anthias ...................... 715/733 |
| 6,563,836 B1 * | 5/2003 | Capps et al. ................ 370/412 |
| 6,597,688 B2 * | 7/2003 | Narasimhan et al. ........ 370/353 |
| 6,801,520 B2 * | 10/2004 | Philonenko ................. 370/351 |
| 6,816,458 B1 * | 11/2004 | Kroon ......................... 370/235 |
| 2002/0120702 A1 * | 8/2002 | Schiavone et al. .......... 709/207 |
| 2002/0143592 A1 * | 10/2002 | Nishikawa et al. ............. 705/7 |
| 2003/0182464 A1 * | 9/2003 | Hamilton et al. ........... 709/314 |
| 2004/0240458 A1 * | 12/2004 | T V et al. ................... 370/412 |
| 2004/0252709 A1 * | 12/2004 | Fineberg ..................... 370/412 |
| 2005/0071848 A1 * | 3/2005 | Kempin ...................... 719/314 |

OTHER PUBLICATIONS

Cordingley, Peter, "Future Cars: Hit The Road, Chip" *Asiaweek*, Feb. 23, 2001; World Reporter [retrieve on Mar. 13, 2001]. Retrieved from Dialog Information Services, Palo Alto, Canada, USA. Dialog Accession No. 15292300.

* cited by examiner

*Primary Examiner*—ThuHa Nguyen
(74) *Attorney, Agent, or Firm*—Sonnenschein, Nath & Rosenthal, LLP

(57) ABSTRACT

A network messaging protocol enabling messages from multiple network devices to share a single display device is disclosed. The protocol enables a display device to prioritize among incoming messages from different network devices and to prioritize among incoming multiple messages from a single device. The protocol further enables multiple networked devices communicating over an IP based network to share a display device, and also provides the ability for a network device to specify the display characteristics of its message. A display device executing the messaging protocol processes and displays multiple messages from multiple network devices without the need to overwrite important messages or display messages in unreadable sizes.

18 Claims, 14 Drawing Sheets

Figure 8B

Unregister Request 156

160

Unregister Response 158 — Acknowledgement

SYSTEM AND METHOD FOR A PRIORITY MESSAGING PROTOCOL FOR A SHARED DISPLAY DEVICE

TECHNICAL FIELD

The present invention relates generally to the display of messages from multiple electronic devices by a network connected display device, and more particularly, to a priority based messaging protocol facilitating the sharing of a single display device by multiple electronic devices connected to a network.

BACKGROUND OF THE INVENTION

Electronic devices connected to a network often display data to a user. Customarily, this is done by sending the information to a display device where the data is displayed. This approach works well when the display device is dedicated to a single application/device. Problems arise, however, when multiple devices are forced to share a single display surface.

Currently, there are two main approaches to allowing multiple network devices to share a single display device. In the first approach, multiple network devices share a single display device by partitioning the display surface into separate discrete areas. Each discrete area becomes dedicated to a single device. The result of such an approach is that each device has less available display surface dedicated to the device. For example, in a car, the display surface might be divided to show a gas indicator, a mile per hour indicator, a tachometer, a headlight indicator, and a warning gauge. Splitting the display surface in such a manner reduces the size of the information that is displayed for any device, and a driver viewing the display surface is required to focus harder in order to see any particular item. Another approach is to allow information from a device to overwrite the previous information that is displayed for another device. Thus, for example, information from the cd player indicating a new song is starting overwrites the mile per hour indicator that is already displayed on the display surface. Moreover, a subsequent warning message about the windshield washer fluid being low overwrites the message from the CD player. There is no guarantee that the most important message will be displayed long enough for the user to actually see the message.

Neither of the current approaches described above provides an optimal solution to the problem of multiple networked devices sharing a single display device. Either the messages are inconsistently displayed, or the displayed messages quickly get too small to easily read.

SUMMARY OF THE INVENTION

The present invention addresses the display limitations encountered by multiple network devices attempting to display messages on a single display device. It enables multiple electronic devices connected to a network to efficiently share a single display device. The messaging protocol of the present invention enables the prioritizing of incoming messages by the display device, functions over an IP based network, and provides for customizing the displayed message appearance.

In one embodiment of the present invention a method is practiced whereby a network messaging protocol enables multiple electronic devices having network interfaces to share a single display device for the purpose of displaying messages. A network device utilizing the protocol which wishes to display messages on a shared display device, first sends a registration request to the display device. The display device, running the server side of the protocol, responds with an acknowledgment and an ID number for that particular network device. The display device also creates a message queue tied to the just assigned network device ID number which will be used to store incoming messages from the network device. Incoming messages from registered network devices arriving at the display device are stored in the appropriate device message queue. Both the network device itself and the individual messages within a queue are assigned separate priority levels. The display device executes a scheduling algorithm whereby the device with the highest priority gets its messages displayed first. The incoming messages are further sorted by priority within the message queue for the individual device. That is, messages coming from the same device may have different priority levels and those with the highest priority level will be displayed first regardless of when in time they arrived at the display device message queue. The protocol further enables the dequeuing (removal) of a message from a particular device queue, the ability for a device to list all of the messages currently stored in its device queue, and provides for the unregistering of the device when the device is done accessing the display.

In an alternative embodiment of the present invention, the network environment used by the present invention is located within a motor vehicle. The networked devices sending messages to the display device are electronic devices connected to the motor vehicle network, such as a CD player, stereo, global positioning satellite receiver, etc. The protocol functions exactly the same for a motor vehicle network as it does for networks which are not located in a motor vehicle. Those skilled in the art will recognize that the electronic devices listed above as part of the motor vehicle network are listed for illustration purposes and are not a definitive list of the electronic devices that may be attached to the motor vehicle network.

BRIEF DESCRIPTION OF THE DRAWINGS

FIG. 8B is a block diagram that shows the format utilized in the body of the message packet during a network device's unregister request message and display device response to an unregister request message.

DETAILED DESCRIPTION OF THE INVENTION

The illustrated embodiment of the present invention provides a network messaging protocol enabling messages from multiple network devices to share a single display device. The protocol enables a display device to prioritize amongst incoming messages from different devices and to prioritize amongst incoming multiple messages from a single device. The protocol further enables multiple networked devices communicating over an IP based network to share a display device, and also provides the ability for a network device to specify the display characteristics of its message. A display device executing the messaging protocol of the present invention processes and displays multiple messages from multiple network devices without the need to overwrite important messages or display messages in unreadable sizes, unlike conventional display devices.

Figure 1:
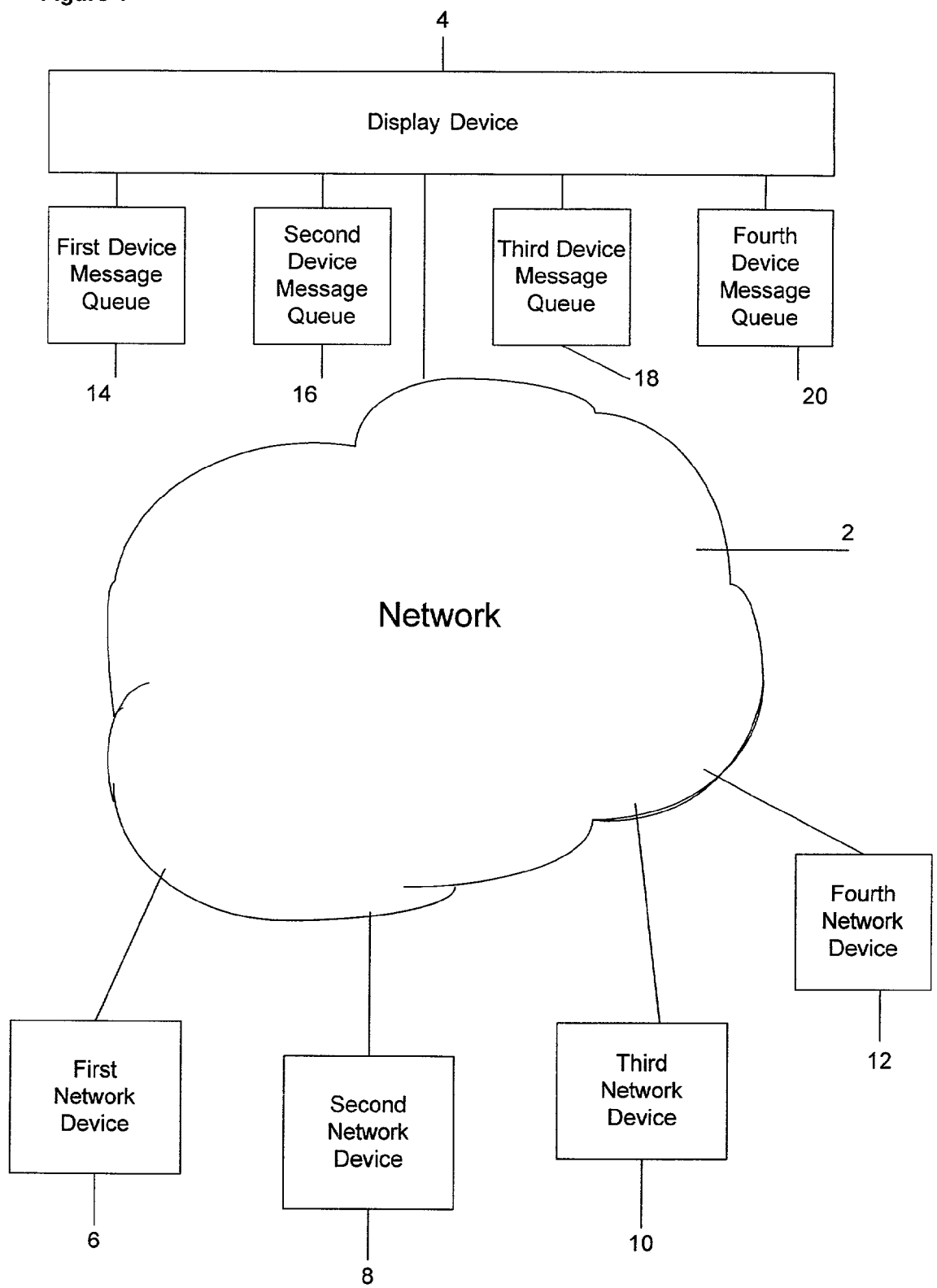
FIG. 1 is a block diagram of the illustrative embodiment of the present invention being implemented by four network devices and a display device.

FIG. 1 depicts an environment suitable for practicing the illustrated embodiment. The environment includes a network 2 to which a display device 4, a first network device 6, a second network device 8, a third network device 10, and a fourth network device 12 are interfaced. The display device 4 has a separate message queue 14, 16, 18 and 20 for each of the network devices 6, 8, 10 and 12. The network devices 6, 8, 10 and 12 have registered with the display device in accordance with the network messaging protocol, as will be described in more detail below. Thus the display device 4 has a first device message queue 14, a second device message queue 16, a third device message queue 18, and a fourth device message queue 20. The message queues function as holding areas for messages waiting to be displayed. The criteria for displaying messages waiting in the various message queues is more fully set forth below.

Figure 2:
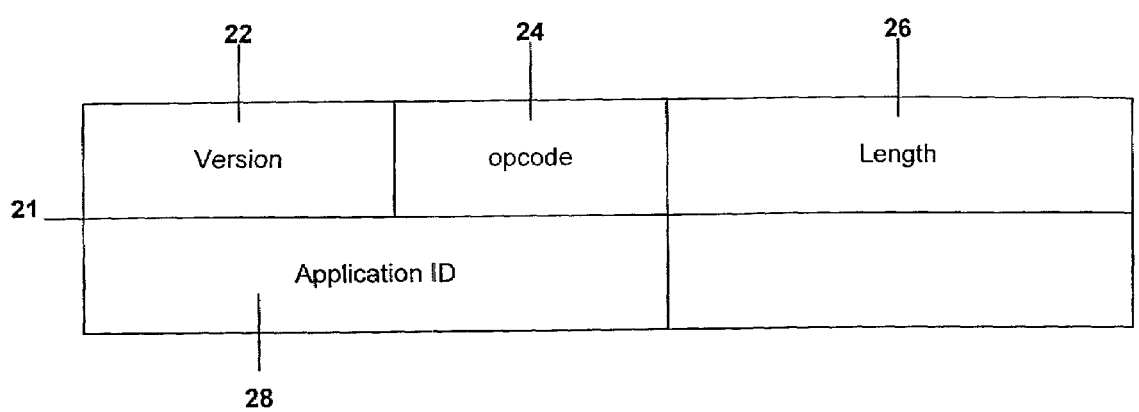
FIG. 2 is a block diagram of the message header packet utilized in the present invention.

The network messaging protocol follows a basic request-response model, where the network device executing the client side of the protocol makes a request by sending a message to the display device, and the display device executing the server side of the protocol responds to the request with its own message back to the network device. FIG. 2 depicts a packet header 21 utilized by the protocol.

The packet header precedes the body of each message sent in the protocol. The priority messaging protocol header includes a version field 22 containing a software release version number, an operations code field 24 containing the protocol code for the particular protocol function indicated by the message, a length field 26 indicating the total length of the remaining packet, and an application ID field (device ID) 28 which is assigned by the display device.

In the network messaging protocol a client may issue a number of different types of requests, these requests include a Registration request, a Queue Message request, a Dequeue Message request, a List Messages request, a Status request, and an Unregister request. These requests will be described in more detail below. Each of these different types of requests has a different operation code that will appear in the packet header prior to the body of the request messages. For each of the requests, there is a corresponding response from the display device. Each response has a different opcode that will appear in the packet header prior to the response message.

Figure 3A:
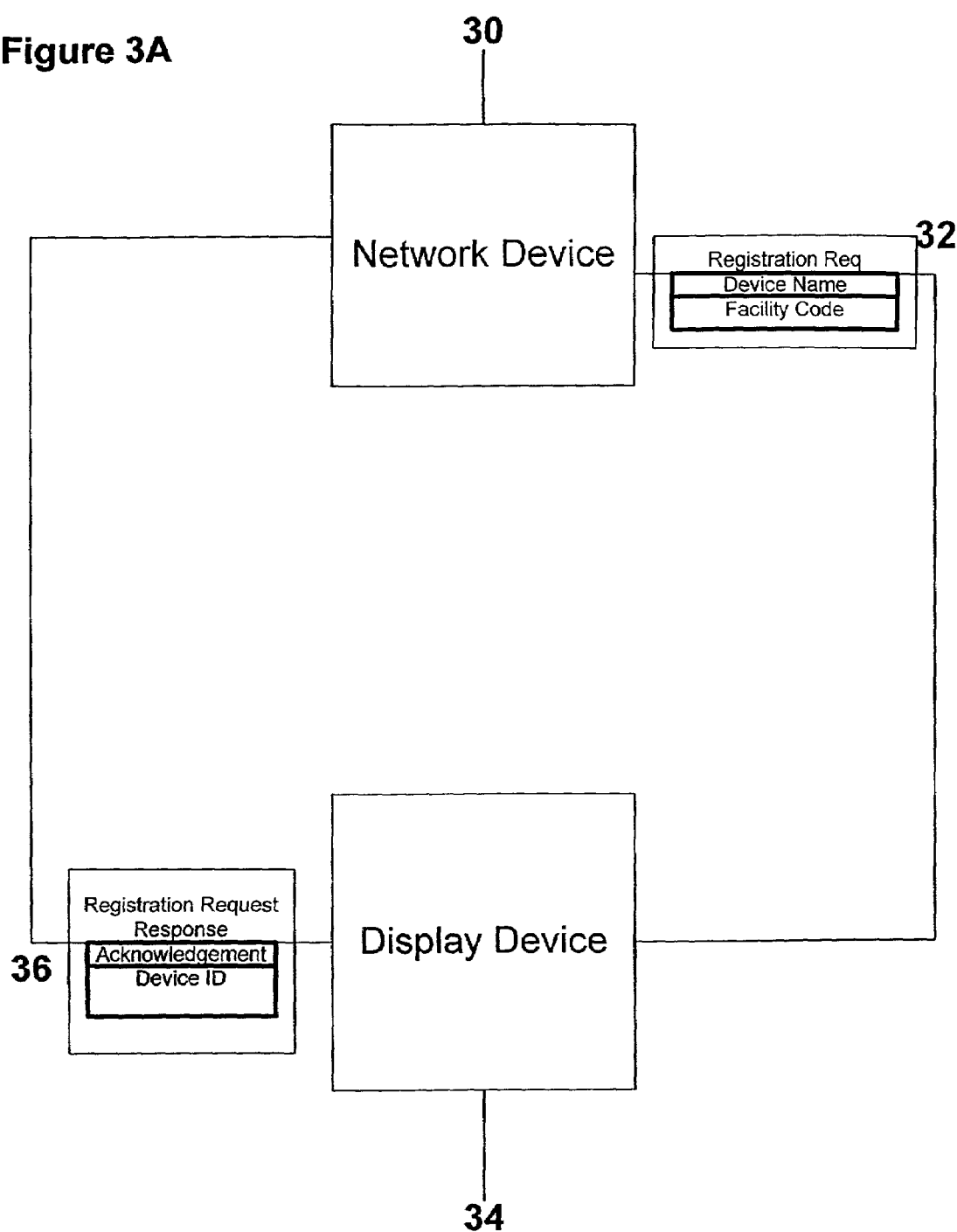
FIG. 3A is a flow chart depicting the steps followed by the illustrative embodiment of the present invention during a device registration request message.

A first type of client side request is a Registration request. When a network device wishes to use a shared display device, the network device first must register with the display device. Registration is accomplished through a request as set forth in the protocol. The header for the request indicates through the opcode that the packet following the header is part of the registration request. Because the device has not yet registered, the application ID is set to zero. The registration process is depicted in FIG. 3A. A network device 30 sends a Registration request 32 to the display device 34. The Registration request 32 includes both the device name and the facility code identifying the location of the network device 30. The display device 34 upon receiving the registration request 32 assigns an application/device ID number to the network device, and sends an acknowledgment 36 back to the network device 30. The network device 30 uses the application/device ID in all further communications with the display device.

Figure 3B:
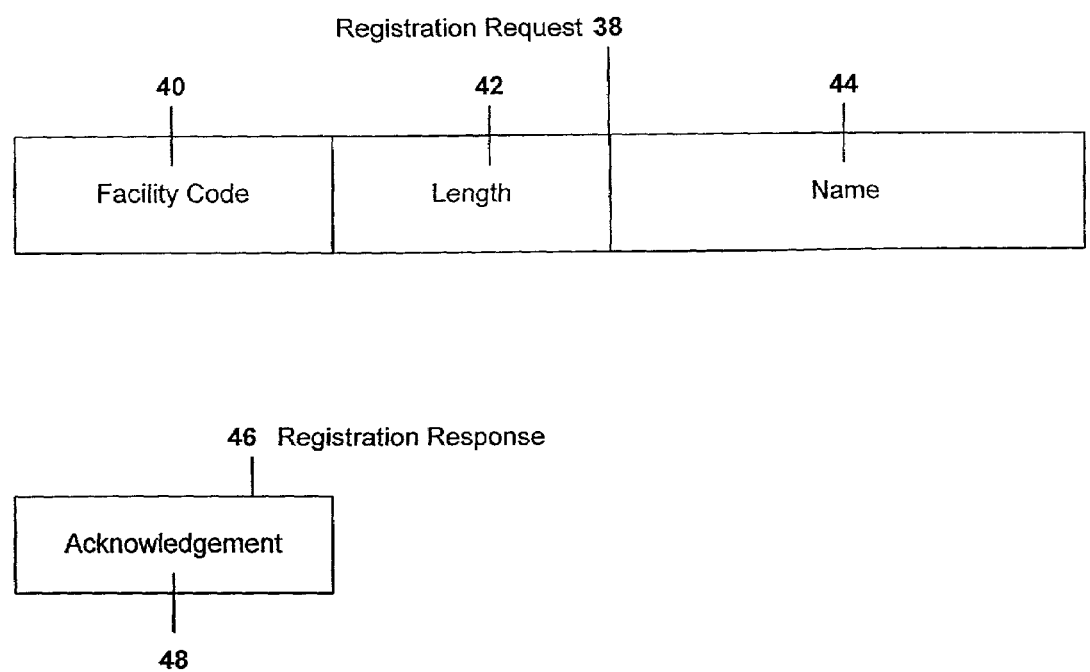
FIG. 3B is a block diagram that shows the format utilized in the body of the message packet during a network device registration request message and display device response to a registration request message.

The frame format for the Registration request is depicted in FIG. 3B. The body of the Registration request 38 includes fields for a facility code 40, and a length field 42, which indicates the length of the name field 44 immediately following the length field. The display device 34 responds to the request with a response message in which the header indicates a response to a Registration request follows. The header's application/device ID field is set to the just assigned number of the network device registering, and the body of the response 46 includes an acknowledgment field (ACK) 48 which indicates the registration was successfully completed. In the event the registration is not successfully completed, the acknowledgement field 48 contains an error code.

Figure 4A:
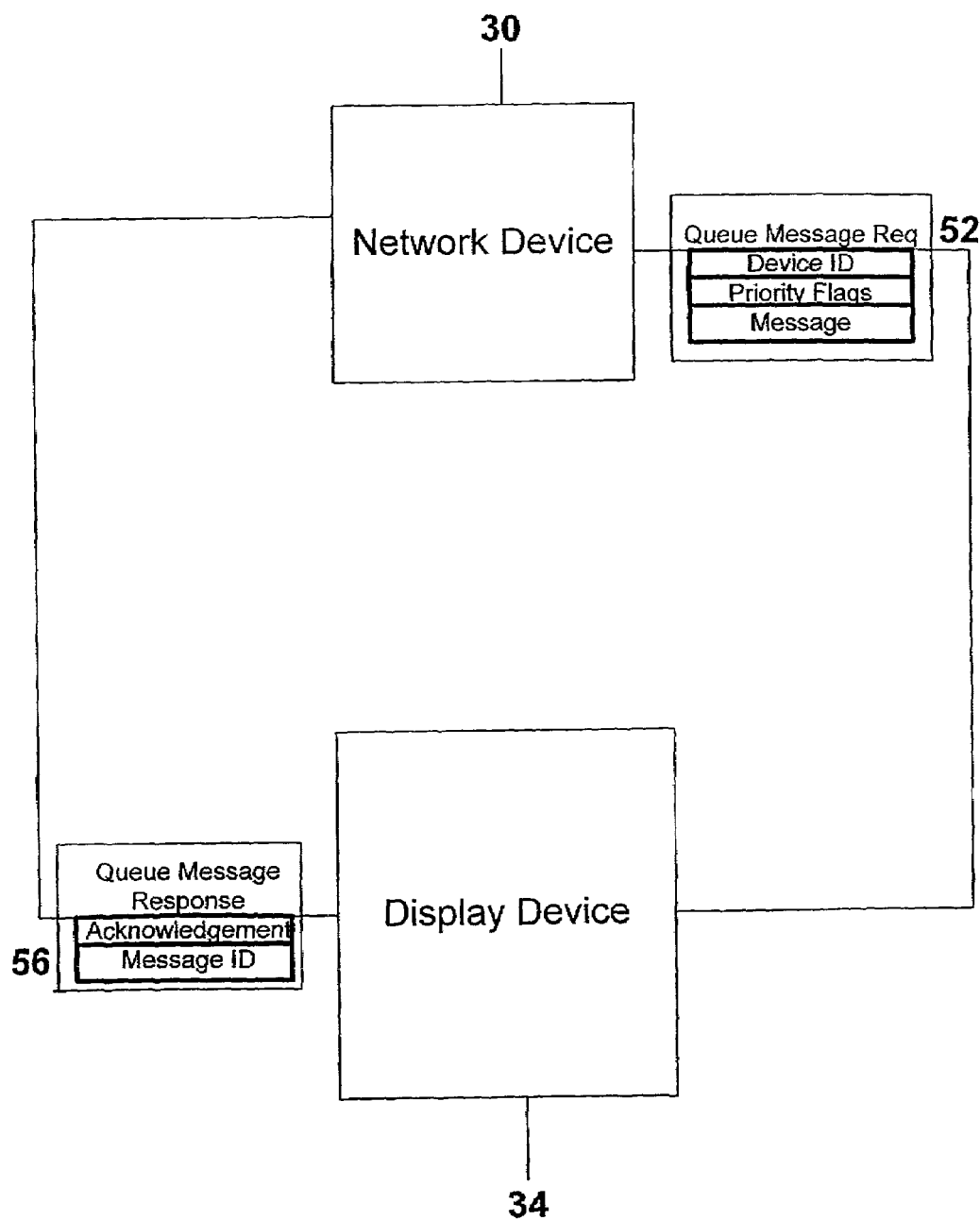
FIG. 4A is a flow chart depicting the steps followed by the illustrative embodiment of the present invention during a device's queue request message.

Once the network device 30 has successfully registered with the display device, it is then able send messages to the display device for display. Messages are sent to the display device using a Queue Message request. As depicted in FIG. 4A, a network device 30 sends a Queue Message request 52 to a display device 34. The Queue Message request 52 includes the application/device ID identifying the registered device, a priority level for the message (i.e.: priority flags), and additional information indicating how the message is to be displayed by the display device along with the message payload. The display device 34 responds with a Queue Message 56 which includes an acknowledgment or error message and, in the event of a successful completion of the operation, the message ID that was assigned to the new message. The display device uses the message ID to identify particular messages stored in a priority message queue.

Figure 4B:
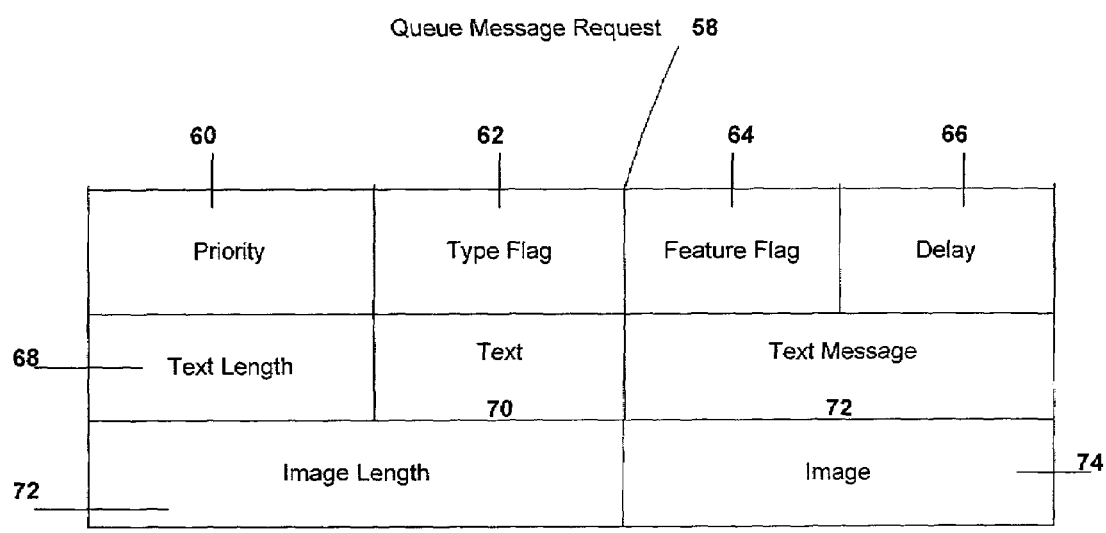
FIG. 4B is a block diagram that shows the format utilized in the body of the message packet during a network device's queue request message and display device response to a queue request message.
Figure 4B:
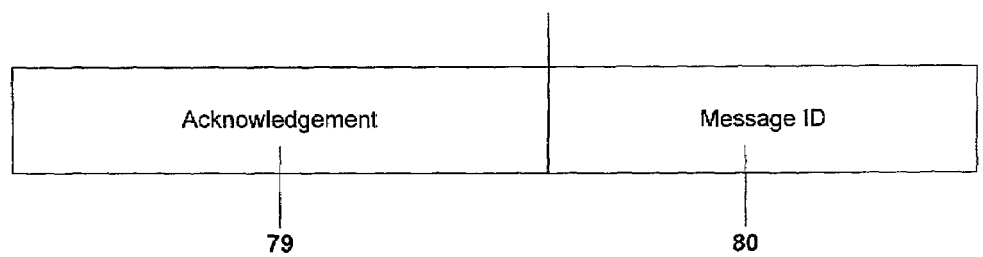

The details of the queue message request frame format are depicted in FIG. 4B. The body of the Queue Message request 58 includes a priority field 60, which indicates the priority of the message, a type flag field 62, which indicates whether the message is a text message, an image message or both, a feature flag field 64, which indicates whether the display surface should first be cleared, whether the message should scroll either horizontally or vertically, and whether the message should be persistent. The Queue Message request 58 further includes a delay field 66 indicating how long the message should be displayed and a text length field indicating the number of bytes in the text string being sent. A text message field 70, contains the actual message bytes. An optional image length field 72, may be included to indicate the number of bytes in the image message, and an optional image field 74 containing the actual image bytes in the message may be provided. The body of the Queue Message response 78 includes fields for an Acknowledgement 79 and a Message ID 80 that is assigned by the display device to the message accompanying the message request. The actual message itself is placed in a priority message queue dedicated to messages received from the registered network device and indexed via the Message ID 80.

In an alternate embodiment, the extensible markup language (XML) may be used in the present invention. If XML is used for the priority messaging protocol, the exact structure of the message will be defined within an XML string.

The display device runs a scheduling algorithm to determine which messages are displayed. The algorithm first searches to find out which registered network device has been assigned the highest device priority. In the event that the network device with the highest device priority has messages waiting for display in its priority queue, the display devices selects a message from the queue. The message selection from within a queue is also priority based. The display device 34 retrieves the message with the highest priority from the queue and displays it on the screen. The length of time and the manner in which the message is displayed is dictated either by the display characteristics specified in the message sent by the network device 30, or by the default parameters of the display device 34 if the message does not contain any requested display characteristics.

Figure 5A:
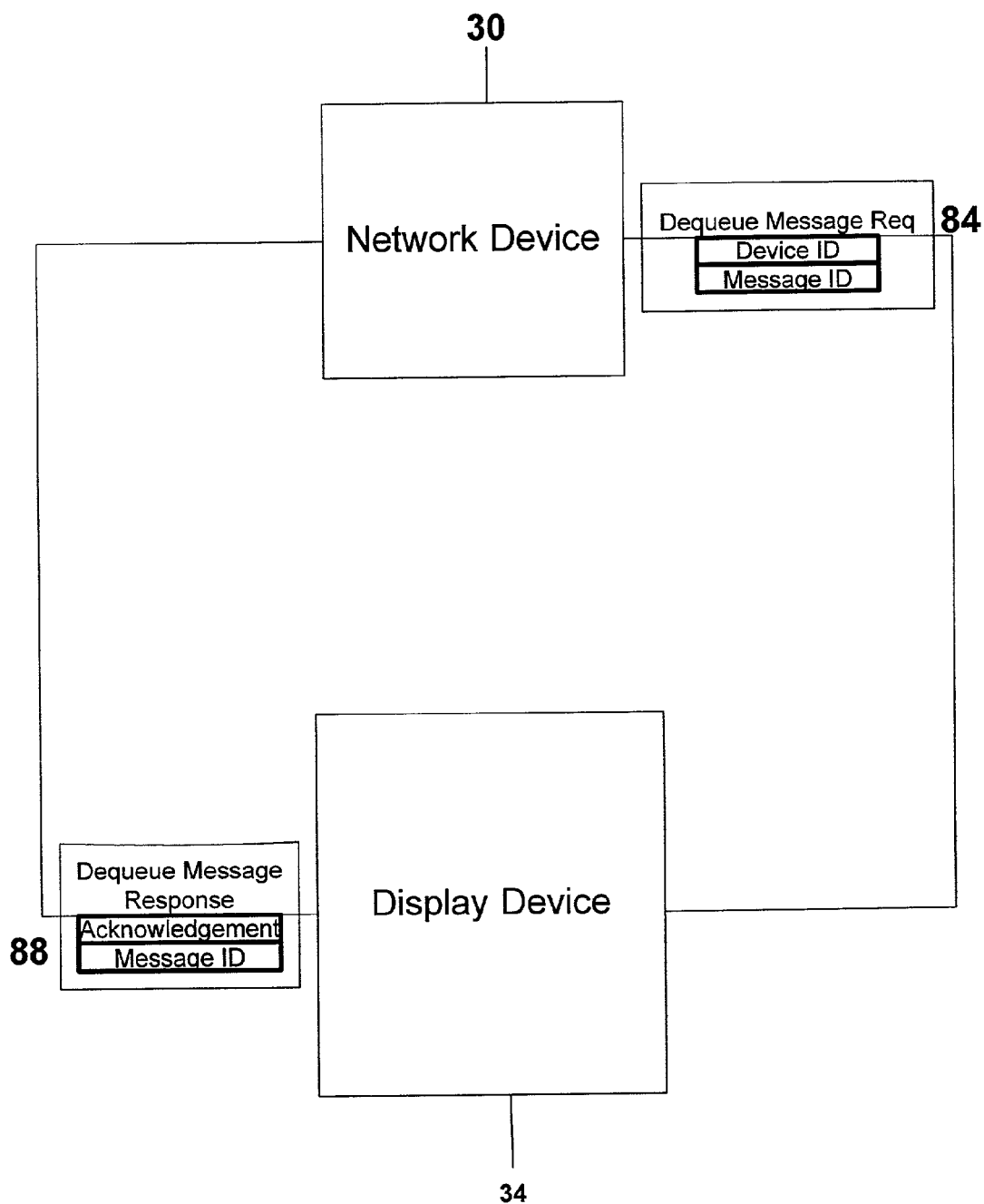
FIG. 5A is a flow chart depicting the steps followed by the illustrative embodiment of the present invention during a device's dequeue request message.

The illustrative embodiment of the present invention also includes a Dequeue request. The Dequeue request removes a previously sent message from the message queue of the requesting device. The sequence of steps followed by a network device attempting to dequeue a message in the illustrated embodiment of the present invention are depicted in FIG. 5A. A network device 30 sends a Dequeue Message request 84 which includes both a device ID identifying the network device, and a message ID identifying the message the network device wishes to remove from its queue. The display device 34, upon receiving the Dequeue Message request 84, attempts to dequeue the message and sends a Dequeue Message response 88 which includes either an acknowledgment or an error message along with a return message ID identifying the message that was removed from the queue in the event the operation was successful.

Figure 5B:
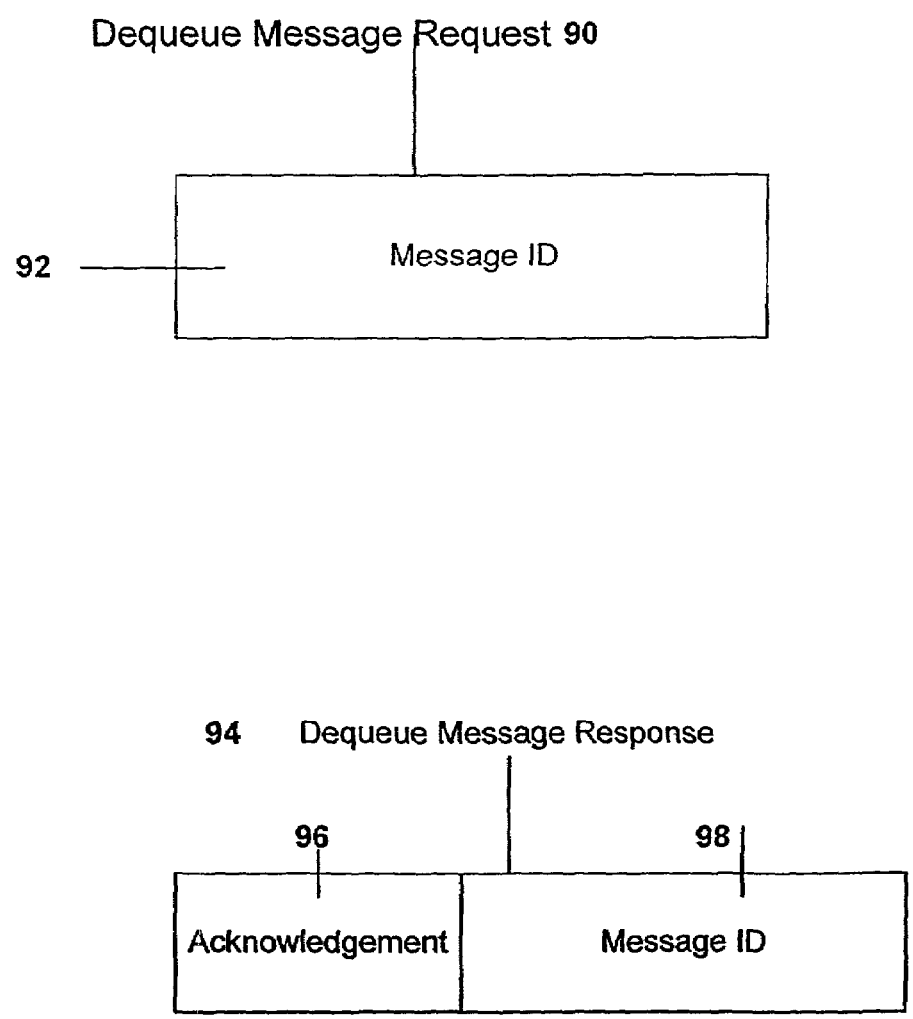
FIG. 5B is a block diagram that shows the format utilized in the body of the message packet during a network device's dequeue request message and display device response to a dequeue request message.

FIG. 5B depicts the body of the Dequeue Message request 90. It includes a message ID field 92 identifying the particular message which the network device wishes to remove from its queue. The body of the response message 94 includes an acknowledgment field 96 and a message ID 98 indicating the message that was removed from the queue. In the event the message was successfully removed, the acknowledgement field contains the number 0 and the message ID contains the message ID of the removed message. Conversely, if an error removing the message was encountered, the acknowledgement field will contain a non-zero number equating to a defined error message and the message ID field will be set to zero indicating no message was removed.

Figure 6A:
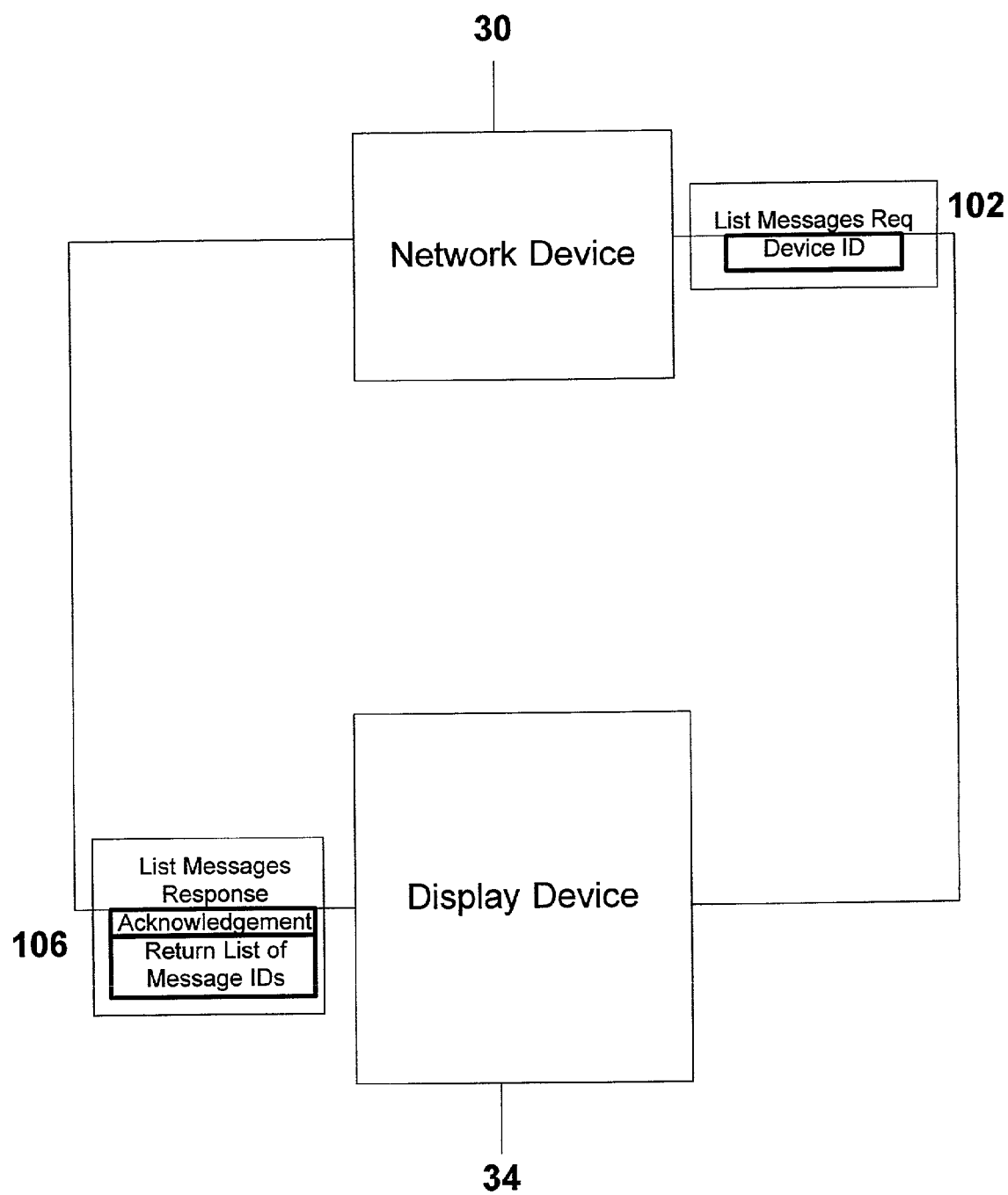
FIG. 6A is a flow chart depicting the steps followed by the illustrative embodiment of the present invention during a device's list message request message.

The illustrated embodiment of the present invention also enables a network device to request a list of all the message ID's in the priority message queue for that device. The sequence of events illustrating this List Message request is depicted in FIG. 6A. A network device 30 sends a List Message request 102 containing the application/device ID to a display device 34. The display device 34 sends the List Message response 106 back to the network device 30. The List Message response 106 includes an acknowledgment and a return list of all of the message ID's in the network device's priority queue, or else the List Message response contains an error message.

Figure 6B:
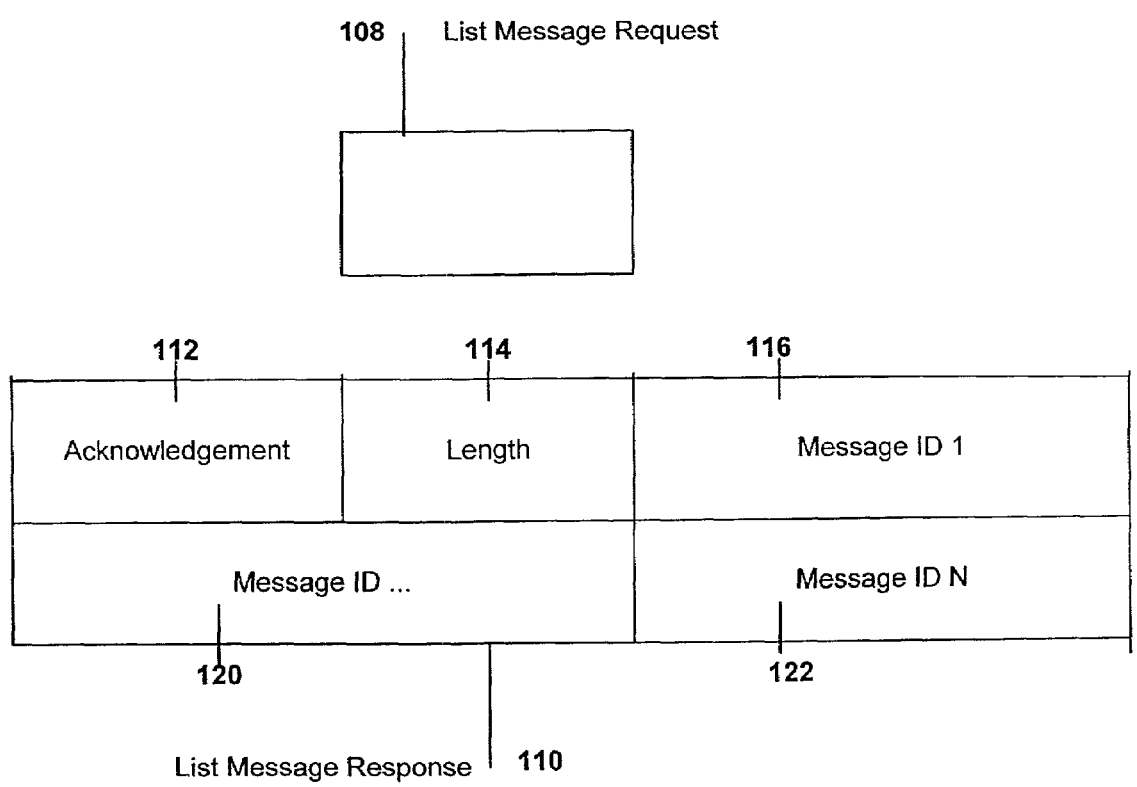
FIG. 6B is a block diagram that shows the format utilized in the body of the message packet during a network device's list message request message and display device response to a list message request message.

FIG. 6B depicts the frame format used in the body of the List Message request and the body of the corresponding List Message response. The actual body of the List Message request is empty as the header contains both the operation code and the device ID which is all the information required for the request. The body of the response to the List Message request 110 includes an acknowledgment field, a length field indicating the length of the rest of the response 114, and message ID fields 116, 120, 122 corresponding for message ID's one to N.

Figure 7A:
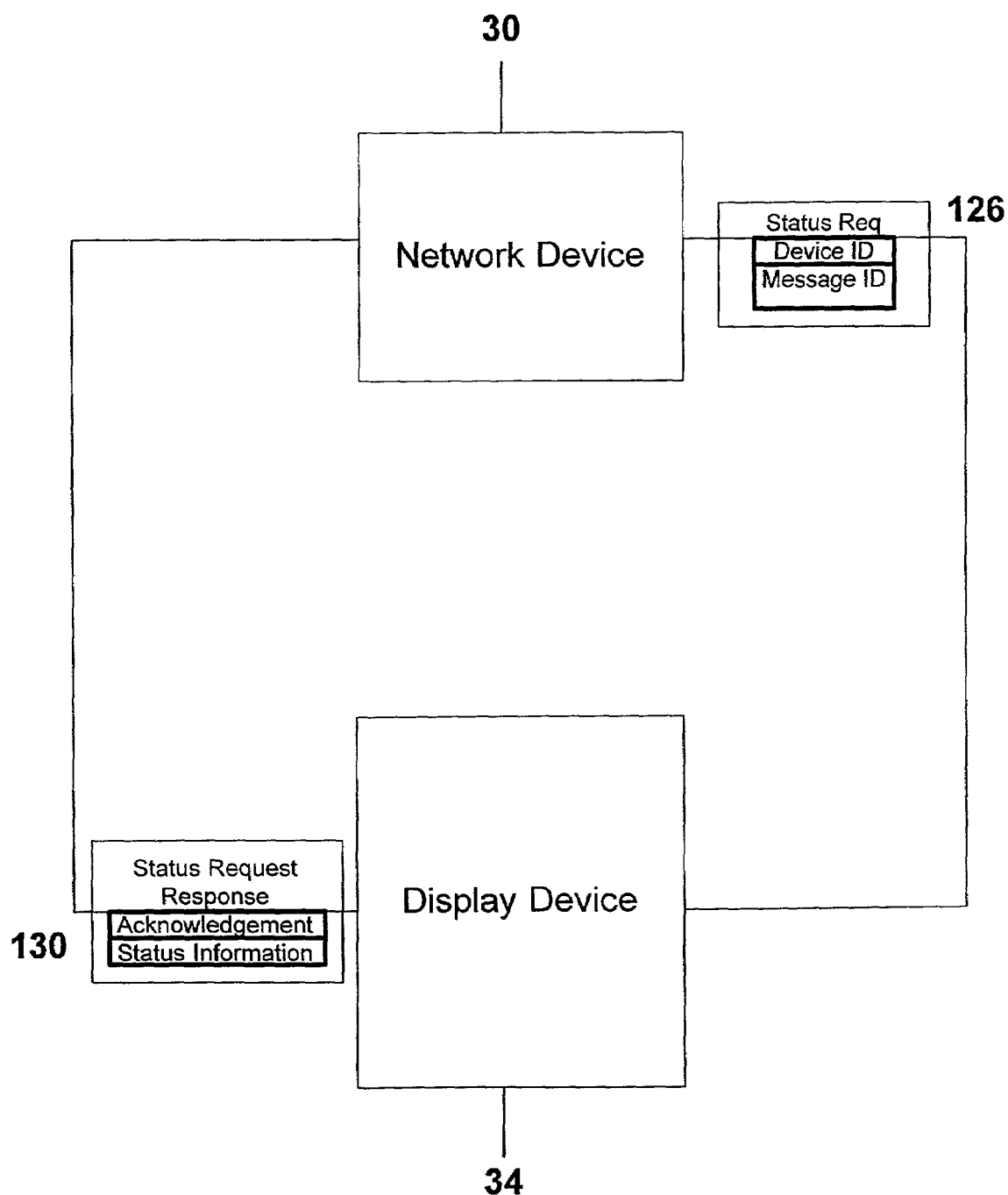
FIG. 7A is a flow chart depicting the steps followed by the illustrative embodiment of the present invention during a device's status request message.

The illustrative embodiment of the present invention provides a network device 30 with the capability to request the status of a particular message in its priority message queue. FIG. 7A depicts the sequence of events by which a network device 30 requests the status of a particular message in its priority message queue. A network device 30 sends a status request 126 which includes an application ID and the message ID whose status is requested. The display device 34 upon receiving the request sends a status request response 130 which includes an acknowledgment and a status information.

Figure 7B:
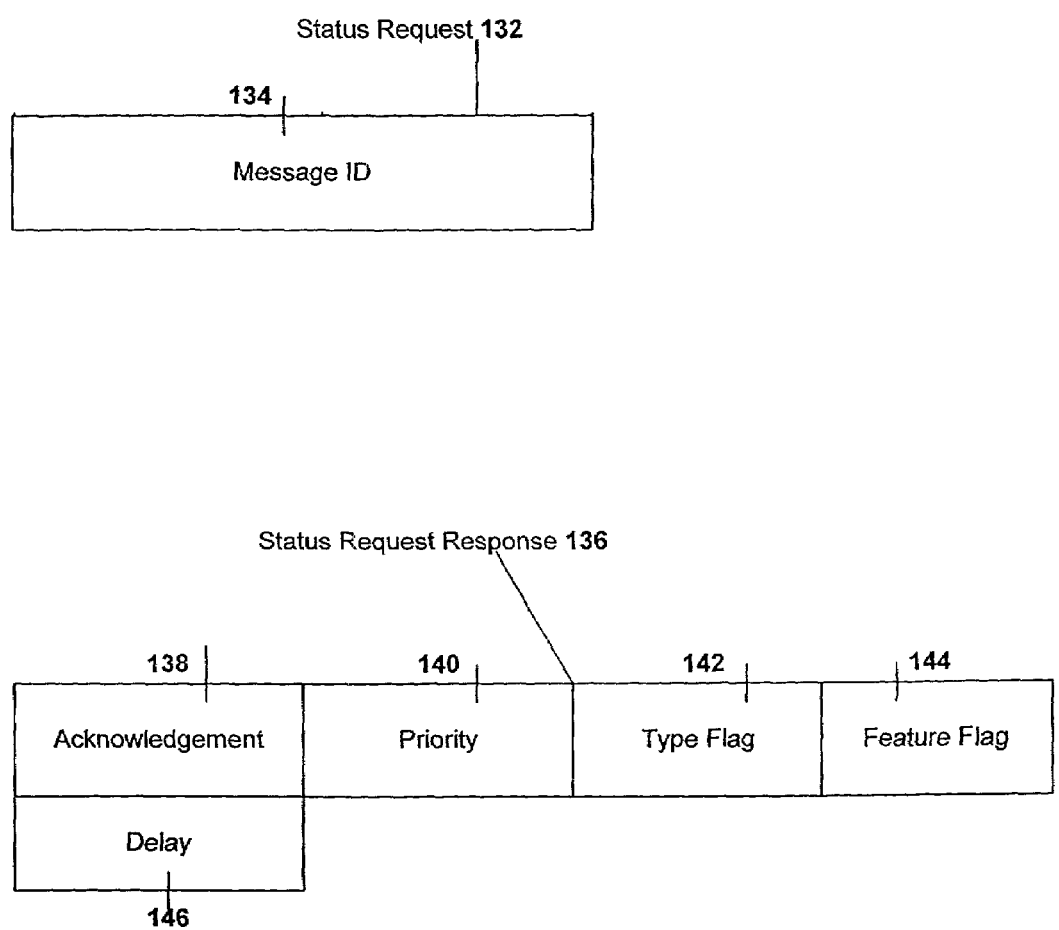
FIG. 7B is a block diagram that shows the format utilized in the body of the message packet during a network device's status request message and display device response to a status request message.

FIG. 7B depicts the message body of the status request 132 which consists solely of the message ID 134 field, as the message header op code indicates the message was a status request. The message body of the status request response 136 includes an acknowledgment field 138, a priority field 140, indicating the messages priority, a type flag field 142 indicating the type of message text image or both, a feature flag field 144 indicating the display features associated with the message, and a delay field 146 indicating the length and time the message is to be displayed. This information provides a snapshot of how the display device recorded the message in the priority queue.

Figure 8A:
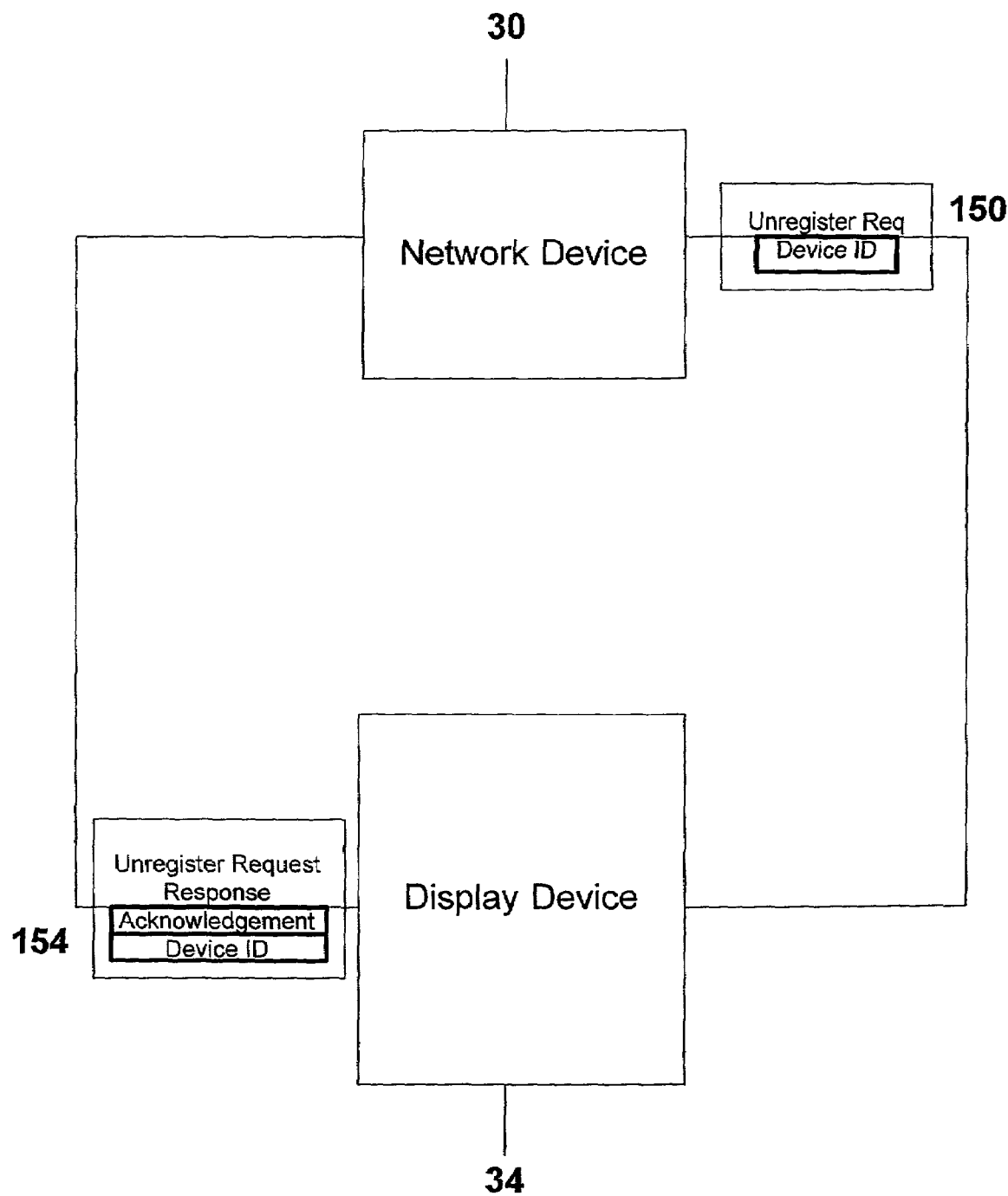
FIG. 8A is a flow chart depicting the steps followed by the illustrative embodiment of the present invention during a device's unregister request message.

The illustrated embodiment of the present invention also includes an Unregister request to be performed by a network device when it is done accessing the display device. FIG. 8A depicts the steps of the Unregister request. A network device 30 sends an Unregister request 150 accompanied by the device ID previously assigned to the network device. The display device 34 sends an Unregister request response 154 containing an acknowledgment and the device ID being unregistered or else an error message back to the network device 30. The actual body of the Unregister request 156, as depicted in FIG. 8B, is empty. The body of the Unregister response message 158 consists solely of an acknowledgment field 160.

It will thus be seen that the invention efficiently attains the objects made apparent from the preceding description. Since certain changes may be made without departing from the scope of the present invention, it is intended that all matter contained in the above description or shown in the accompanying drawings be interpreted as illustrative and not in a literal sense. Practitioners of the art will realize that the separate requests and responses illustrated herein may have fields added or deleted from the request or response and additional requests and responses may be added from one protocol version to the next without departing from the scope of the present invention.

I claim:

1. A method for displaying messages on a display device, said messages originating from a plurality of networked electronic devices communicating with the display device over a network, said method comprising the steps of:

providing a protocol to enable a plurality of networked devices to send messages to a display device;

registering a plurality of networked electronic devices with said display device, in response to a registration request from each of the networked electronic devices, prior to said display device displaying any messages from the plurality of networked electronic devices, the display device assigning an identifier to each of the networked electronic devices upon registration;

the display device sending the assigned identifiers to the plurality of networked electronic devices in response to the registration; and creating, in response to the registering of the plurality of networked electronic devices with said display device, a separate priority message queue on said display device for each of the plurality of networked electronic devices registered with the display device, each priority message queue having a priority level assigned to it based on an identity of that registered networked electronic device, each display message received by the display device from that registered networked electronic device being placed in the priority message queue that is assigned to that networked electronic device;

creating a unique message ID identifying each message placed in said priority message queue of a given networked electronic device;

selecting a highest priority message queue among the priority message queues, said priority message queue containing at least one message;

selecting from within said highest priority message queue a message with highest message priority level; and displaying said selected message on said display device.

2. The method of claim 1 wherein the network is an Internet Protocol (IP) based network.

3. The method of claim 1 wherein said registering further comprises:

sending to the display device a text string representing a device name for at least one of the networked electronic devices.

4. The method of claim 1 wherein said method further comprises the step of:

sending to the display device a graphical image representing at least one of the networked electronic devices.

5. The method of claim 1, said method comprising the additional steps of:

receiving a display message at the display device from a given one of the networked electronic devices; and placing the received display message in the priority message queue for the given networked electronic device.

6. The method of claim 5 wherein said received display message in the priority message queue for the given networked electronic device contains text.

7. The method of claim 5 wherein said received display message in the priority message queue for the given networked electronic device contains a graphical image.

8. The method of claim 5 wherein said received display message in the priority message queue for the given networked electronic device contains both text and a graphical image.

9. The method of claim 5, said method comprising the additional steps of:

providing a priority level for each display message sent from the given networked electronic device to the display device; and creating a unique message ID identifying each message placed in said priority message queue of said given networked electronic device.

10. The method of claim 5, said method comprising the additional step of:

sending a request to said display device from a registered networked electronic device that is registered with the display device to remove a message from the priority message queue of said registered networked electronic device.

11. The method of claim 5, said method comprising the additional step of:

sending a list of Message IDS appearing in a priority message queue from said display device to a particular networked electronic device registered with said display device in response to a request from said particular networked electronic device.

12. The method of claim 5, said method comprising the additional step of:

sending a status message providing a current status of a message in a priority message queue from said display device to a registered networked electronic device registered with said display device in response to a request from said registered networked electronic device.

13. The method of claim 5, said method comprising the additional step of:

including display instructions as part of the display message sent to said display device by the given networked electronic device registered with said display device.

14. The method of claim 5, said method comprising the additional step of:

unregistering said given networked electronic device registered with said display device.

15. The method of claim 1 wherein said messages are written using extensible markup language (XML).

16. A computer-readable storage medium for use with a display device with a network interface, said computer-readable storage medium holding computer executable instructions when executed by a computer to perform a method comprising the steps of:

providing a protocol to enable a plurality of networked electronic devices to send messages to a display device, and registering a plurality of networked electronic devices with said display device, in response to a registration request from each of the networked electronic devices, prior to said display device displaying any messages from the plurality of networked electronic device, the display device assigning an identifier to each of the networked electronic device upon registration;

the display device sending the assigned identifier to the networked electronic devices in response to the registration;

creating, in response to the registering of the plurality of networked electronic devices with said display device, a separate priority message queue on said display device for each of the plurality of networked electronic devices registered with the display device, each priority message queue having a priority level assigned to it based on an identity of a corresponding registered networked electronic device, each display message received by the display device from a registered networked electronic device being placed in a priority message queue that is assigned to said networked electronic device;

creating a unique message ID identifying each message placed in said priority message queue of a given networked electronic device;

selecting a highest priority message queue among the priority message queues, said priority message queue containing at least one message;

selecting from within said highest priority message queue a message with highest message priority level; and displaying said selected message on said display device.

17. The medium of claim 16 wherein said network is an Internet Protocol (IP) based network.

18. A method for displaying messages on a display device, said messages originating from a plurality of networked electronic devices communicating with the display device over a network, said method comprising the steps of:

providing a protocol to enable a plurality of networked devices to send messages to a display device;

registering a plurality of networked electronic devices with said display device, in response to a registration request from each of the networked electronic devices, prior to said display device displaying any messages from the plurality of networked electronic devices, the display device assigning an identifier to each of the networked electronic devices upon registration;

the display device sending the assigned identifiers to the plurality of networked electronic devices in response to the registration;

creating, in response to the registering of the plurality of networked electronic devices with said display device, a separate priority message queue on said display device for each of the plurality of networked electronic devices registered with the display device, each priority message queue having a priority level assigned to it based on an identity of that registered networked electronic device, each display message received by the display device from that registered networked electronic device being placed in the priority message queue that is assigned to that networked electronic device;

receiving a display message at the display device from a given one of the networked electronic devices;

placing the received display message in the priority message queue for the given networked electronic device;

providing a priority level for each display message sent from the given networked electronic device to the display device;

creating a unique message ID identifying each message placed in said priority message queue of said given networked electronic device;

selecting a highest priority message queue among the priority message queues, said priority message queue containing at least one message;

selecting from within said highest priority message queue a message with a highest message priority level; and displaying said selected message on said display device.

\* \* \* \* \*